No. 708,515. Patented Sept. 9, 1902.
C. B. BALDWIN.
BOX COVERING MACHINE.
(Application filed June 27, 1898.)
(No Model.) 7 Sheets—Sheet 3.
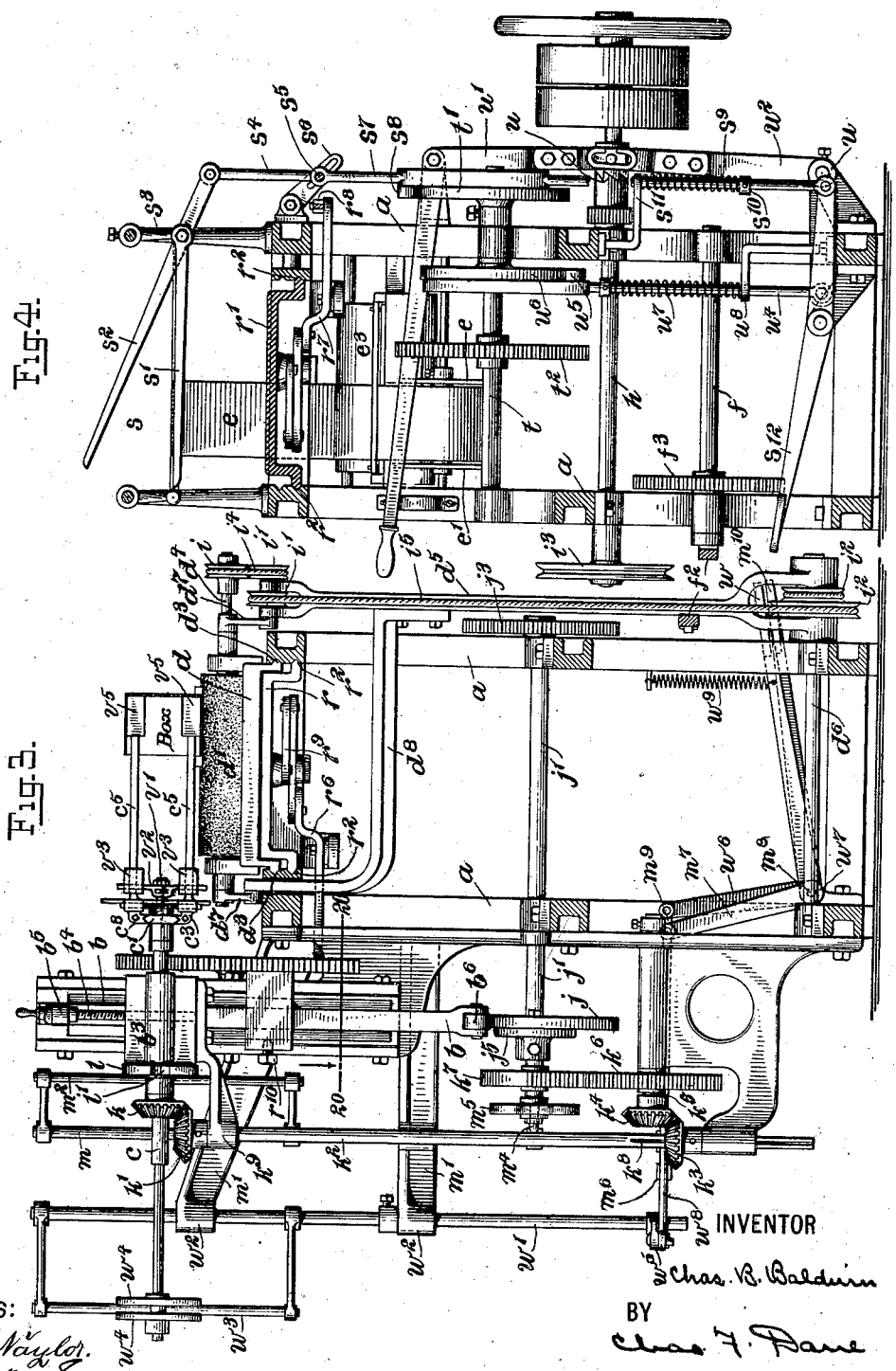

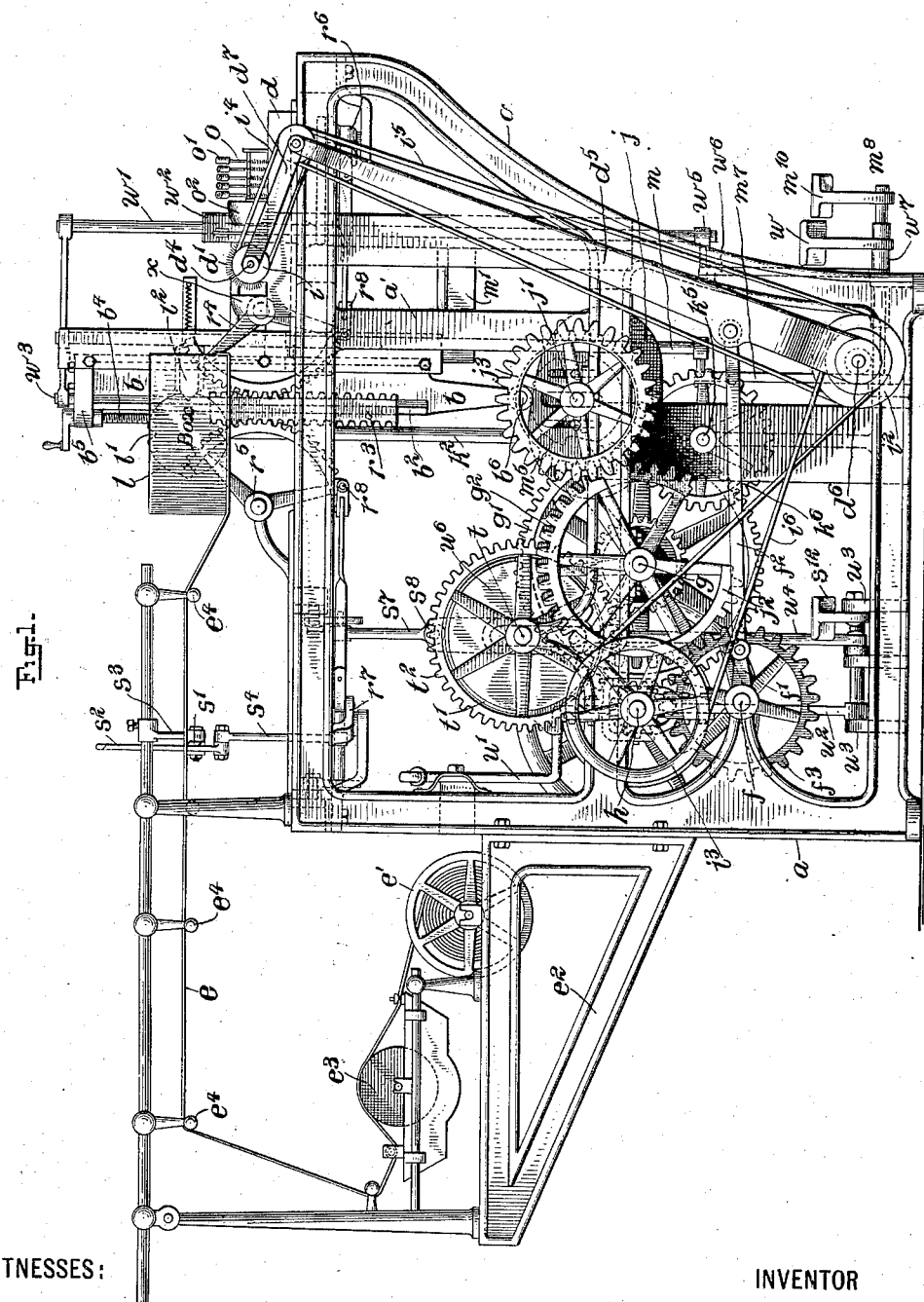

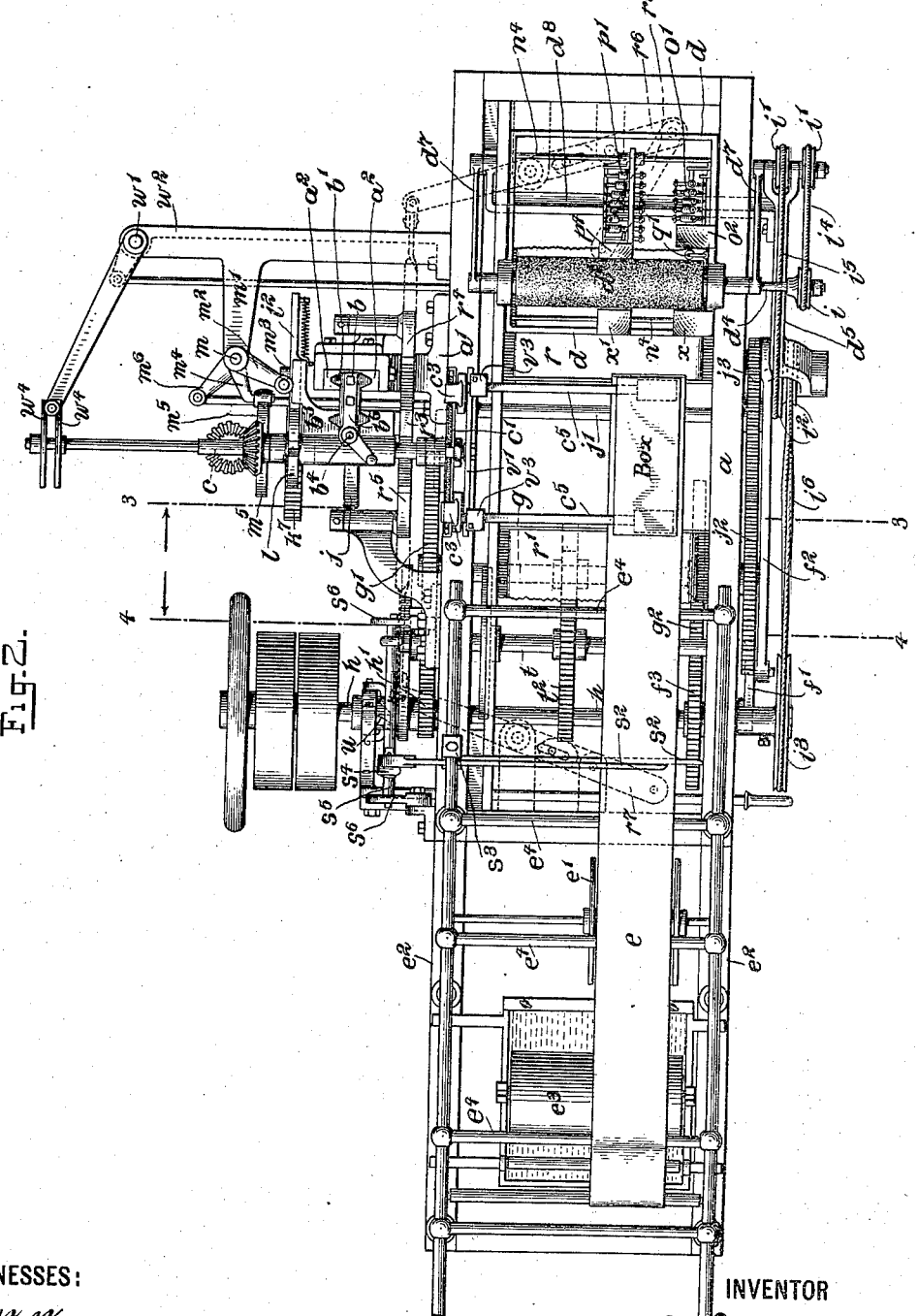

No. 708,515. Patented Sept. 9, 1902.
C. B. BALDWIN.
BOX COVERING MACHINE.
(Application filed June 27, 1898.)
(No Model.) 7 Sheets—Sheet 4.
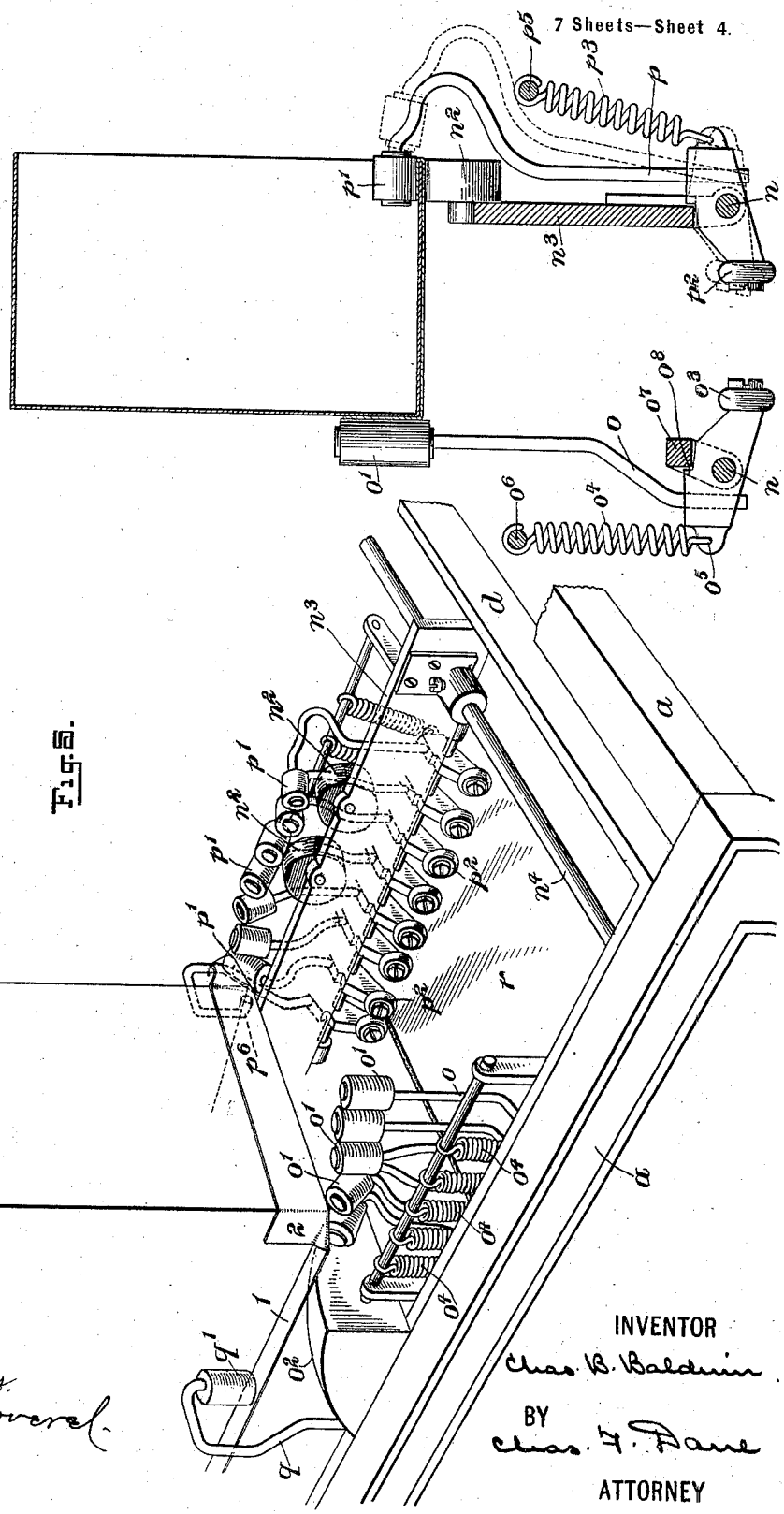
WITNESSES:
INVENTOR
BY
ATTORNEY

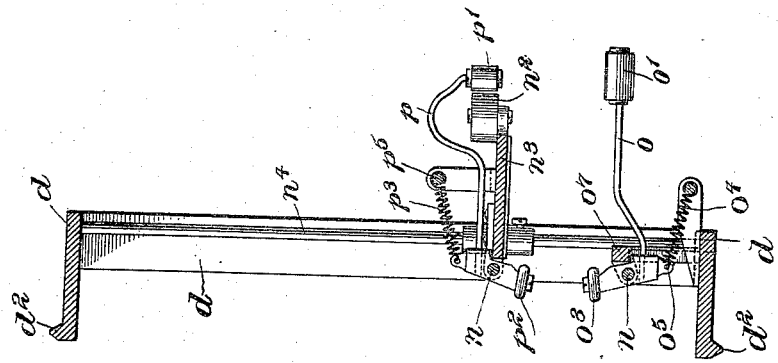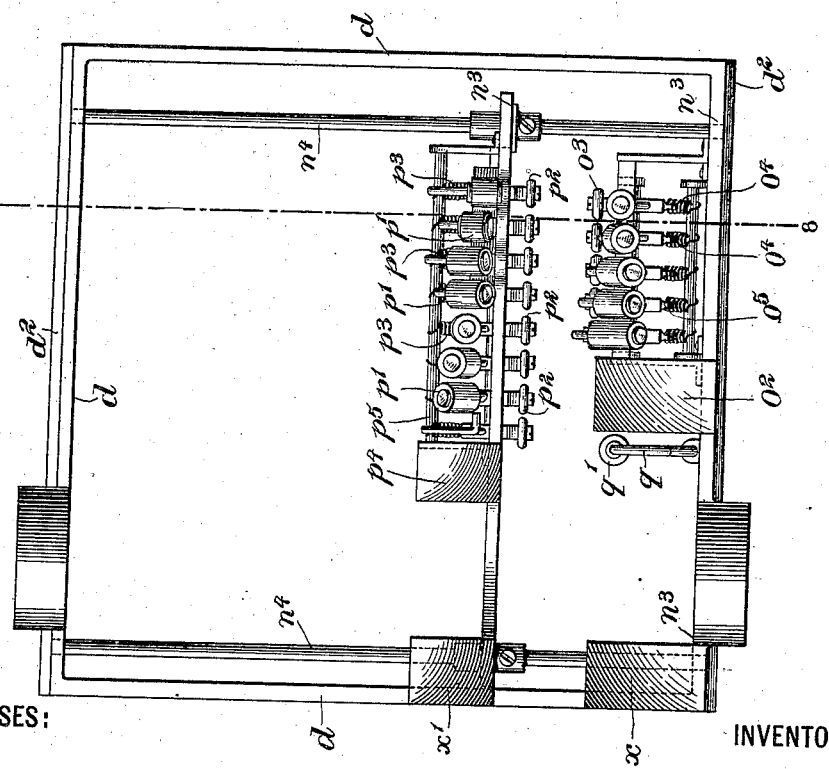

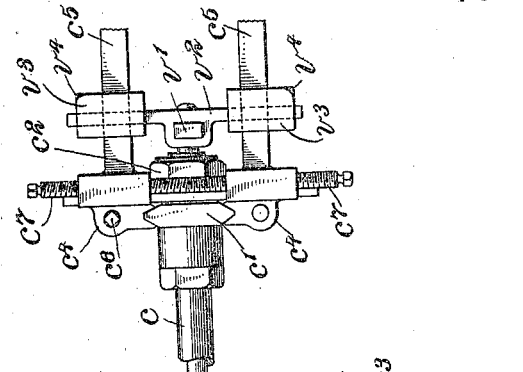
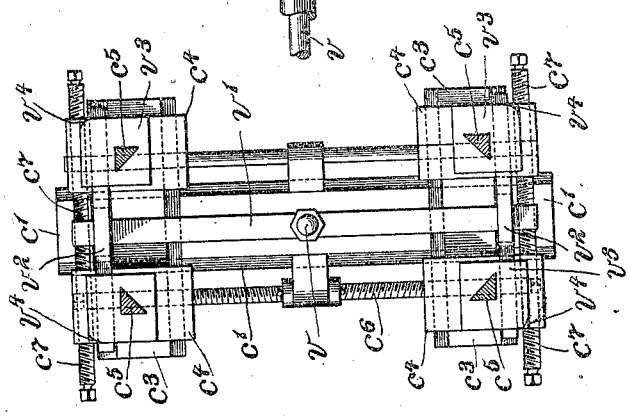
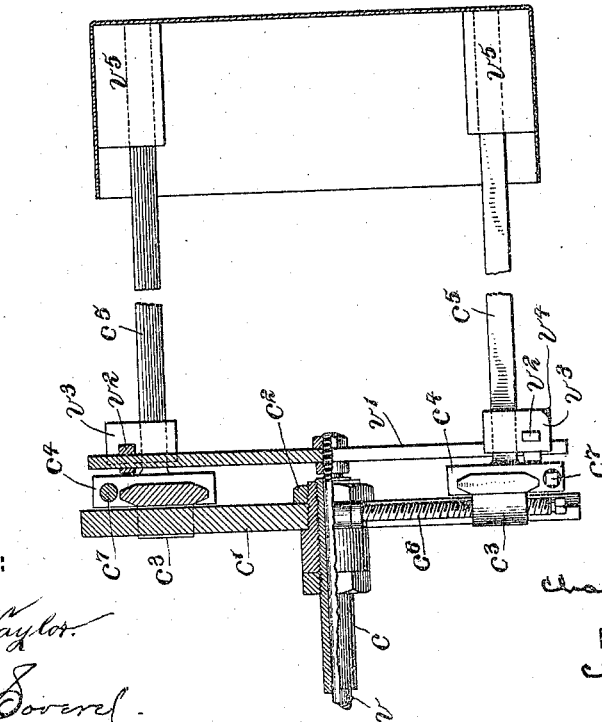

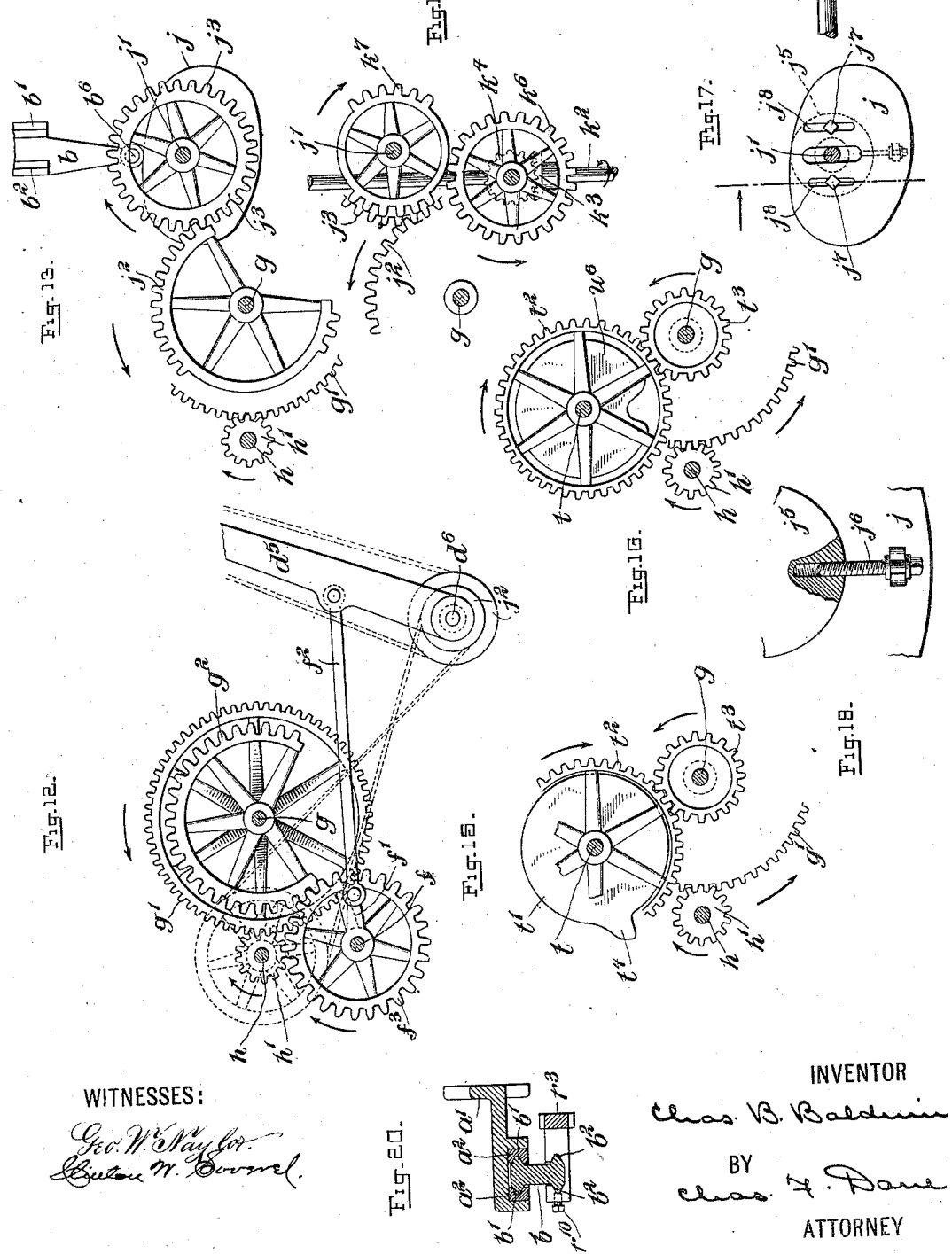

UNITED STATES PATENT OFFICE.

CHARLES B. BALDWIN, OF BROOKLYN, NEW YORK.

BOX-COVERING MACHINE.

SPECIFICATION forming part of Letters Patent No. 708,515, dated September 9, 1902.

Application filed June 27, 1898. Serial No. 684,541. (No model.)

*To all whom it may concern:*

Be it known that I, CHARLES B. BALDWIN, a citizen of the United States, and a resident of the borough of Brooklyn, city of New York, State of New York, have invented certain new and useful Improvements in Box-Covering Machines, of which the following description, taken in connection with the drawings herewith accompanying, is a specification.

This invention relates to that class of machines adapted for applying an external covering of paper or other suitable material upon a box and which usually embody a revolving form or box-holder, a reel carrying a strip of paper or box-covering material, and means for rendering the covering-strip adhesive, whereby it will be caused to adhere to the box when applied to the several sides of the latter as it is turned by the revolving form on which it is held. In addition, however, to thus covering the external sides of the box as accomplished by the machine it is desirable that the covering-strip should also be turned over and around the edges of the box to give the latter a more attractive and finished appearance. To accomplish this, it has heretofore been the practice to have the covering-strip of greater width than the box, whereby it will loosely project at either side beyond the edge of the box after being applied thereto upon the machine. After the covering-strip has thus been applied upon the box the latter is then removed from the form or holder and the loose projecting edges of the strip turned around the edges of the box and pressed against the bottom and inner sides of the same by hand. This hand method of locating the strip around the edges of the box is obviously a slow and expensive one; and it has been the object of my present invention to provide a machine by which the complete operation of locating the covering-strip upon the box, as above referred to—*i. e.*, applying the same to the exterior sides of the box and turning one loose projecting edge around the upper edge of the box and against the inner side of the same and the other loose edge around the lower edge of the box and against the under side of the same—may be automatically performed. This object I secure by means of the construction, arrangement, and combination of parts, as hereinafter set forth in detail, and pointed out in the claims.

A machine embodying my invention embraces as its main and desirable features a form to receive and hold a box, means for smoothing and pressing the covering-strip against the several external sides of the box, and means for turning or bending the loose projecting edges of the strip around the adjacent edges of the box and pressing one of the same against the bottom of the box and the other against the inner wall of the box.

Referring to the drawings, Figure 1 is a front elevation of a machine embodying one practical form of my invention. Fig. 2 is a plan view of the same. Fig. 3 is a vertical section taken through line 3 3 of Fig. 2. Fig. 4 is a vertical section taken through line 4 4 of Fig. 2. Fig. 5 is an enlarged perspective view of a portion of the machine, showing the strip bending and pressing devices beginning to act upon the loose edges of the covering-strip, which project beyond the sides or edges of the box. Fig. 6 is a vertical cross-section taken through the parts shown in Fig. 5 when the strip bending and pressing devices have about completed their action upon the edges of the strip. Fig. 7 is an enlarged plan view of the carriage which supports the strip bending and pressing devices. Fig. 8 is a cross-section through line 8 8 of Fig. 7. Figs. 9, 10, and 11 are detail views of the box-holder and the means for pressing the edge of the covering-strip against the inside corner of the box. Figs. 12, 13, 14, 15, and 16 are detail views showing the connection between the driving-shaft and certain operating parts of the machine. Figs. 17, 18, and 19 are detail views of a cam and its adjusting means. Fig. 20 is a cross-section taken through line 20 20 of Fig. 3.

In the drawings, $a$ represents the main supporting-frame, which is suitably constructed to sustain the several operative parts of the machine. Attached to one side of this frame is a plate or head $a'$, having a vertically-arranged groove in one side thereof, in which two blocks $a^2$ $a^2$ are seated, with a space between the same and each being provided with a groove in their opposite faces. A plate $b$ is supported with one side thereof extending between the said blocks $a^2$ $a^2$ and provided with ribs $b'$ thereon, which fit in the face-grooves of said blocks, as more clearly shown in Figs. 1 and 20, whereby the plate will be retained in connection therewith and be guided when operated, as will hereinafter be described.

On the forward edge of the plate $b$, which is also provided with lateral ribs $b^2$, a block $b^3$ is supported to be vertically movable by having a groove therein to receive said ribs on the plate, whereby a dovetail connection is secured between the parts. This block $b^3$ is held in an adjustable vertically-stationary position relative to the plate $b$ by means of an adjusting-screw $b^4$, which is supported by the overhanging end of a fixed plate $b^5$ on the top of the plate $b$, by which it is held from endwise movement, and at its lower threaded end engages with the block $b^3$ within a screw-threaded opening therein. Supported within a horizontally-arranged bearing in the block $b^3$ is a hollow shaft $c$, which carries at one end thereof the box form and holder. This box-form, as herein illustrated and more clearly shown in Figs. 9, 10, and 11, consists of a head-piece $c'$, having a screw-threaded opening therein to receive the end of the shaft $c$, on which latter it is detachably held in a fixed position by a nut $c^2$. Located upon this head-piece are two longitudinally-movable sliding plates $c^3$ $c^3$, each of which is provided with two blocks $c^4$ $c^4$, having a sliding dovetailed connection therewith. These blocks $c^4$ $c^4$ are each provided with a fixed horizontally-extending arm $c^5$, arranged parallel with each other, upon the outer ends of which a box is adapted to be placed and supported. The several arm-carrying blocks $c^4$ and their supporting-plates $c^3$ are adjustable for the purpose of allowing the box-holding arms to be changed in position relatively to each other, whereby the same may be adapted for holding boxes of different forms and sizes. As a simple and desirable means of adjusting such parts a screw $c^6$ is centrally connected with a fixed part of the head $c'$ to be endwise stationary and at its opposite threaded ends engages with the plates $c^3$ $c^3$, whereby as the screw is turned, its opposite ends being provided with right and left hand threads, respectively, the opposite plates, with their supported blocks, are moved either toward or away from each other. Adjustment of the said blocks is secured in the opposite direction by means of two screws $c^7$ $c^7$, which are centrally connected with a fixed part of the plates $c^3$ $c^3$ to be endwise stationary and engage at their opposite ends, which are provided with right and left hand threads, respectively, with the sliding blocks $c^4$ $c^4$ to move the same longitudinally on the plate $c^3$.

The box-covering strip $e$, as herein shown, is carried by a reel $e'$, which is journaled on a bracket-arm $e^2$, attached to the frame $a$, and is guided from the reel over a moistening or pasting roll $e^3$ and from thence to a position adjacent to the box over a series of intermediately-arranged cross-arms $e^4$, supported by a part of the frame $a$. The box-covering strip may for certain features of my invention be applied to the several sides of the box by hand; but it is desirable that the same should be automatically located and pressed thereon. To provide for this, a carriage $d$, having a rotary brush $d'$ journaled thereon, is supported to have a horizontal sliding movement in the upper part of the frame $a$ by having longitudinal ribs $d^2$ $d^2$ on its opposite sides seated within horizontally-arranged grooves or guideways $d^3$ $d^3$ in the opposite inner walls of the upper part of the frame $a$, as more clearly shown in Fig. 3.

In applying the covering-strip to the box the free end of the same is pressed by the operator on that corner of the box farthest from the reel, as shown in Fig. 1, and the carriage $d$ is then operated to move horizontally beneath the box, whereby the brush $d'$, carried thereby, may be caused to rotate and both smooth and press the pasted covering-strip against such side of the box. The carriage $d$, with its supported brush, may be operated to thus reciprocate horizontally beneath the box-form by any suitable means, the means as herein shown being as follows: The shaft $d^4$, upon which the brush is secured, is journaled in bearings formed in the side walls of the carriage, with its ends projecting laterally beyond said walls. A lever $d^5$, pivotally supported at its lower end upon a shaft $d^6$, attached to the supporting-frame, is connected at its upper end with one end of the said brush-carrying shaft $d^4$ through the medium of a link $d^7$ and is provided with a fixed arm or extension $d^8$, which connects with the opposite end of the shaft $d^4$, also through the medium of a pivoted link $d^7$, as clearly shown in Fig. 3. As a means for vibrating the lever $d^5$ to move the connected carriage back and forth in proper time relative to the movements of the box-holder, as will hereinafter be referred to, I have connected said lever through the medium of a pitman $f^2$ with a crank $f'$ on a rotating shaft $f$, which latter is driven from the main driving-shaft $h$ through the medium of an intermediate shaft $g$ by means of a small gear $h'$ on the driving-shaft meshing with a gear $g'$ on the shaft $g$ and a segmental gear $g^2$ on the latter meshing with a gear $f^3$ on the said crank-shaft $f$, as shown in Figs. 1 and 12. The shaft $f$ being thus operated directly from the segmental gear $g^2$, it receives an intermittent movement which is communicated to the carriage $d$. The brush $d'$ is adapted to be rotated as it is moved beneath the box in order to better insure the spreading and pressing of the covering-strip against the latter. As a simple means for securing such rotation I have located a pulley $i$ upon one end of the brush-carrying shaft $d^4$, two pulleys $i'$ $i'$ upon the pivot-pin which connects the lever $d^5$ and link $d^7$, two pulleys $i^2$ $i^2$ upon the shaft $d^6$, which carries the lever $d^5$, and a pulley $i^3$ upon the driving-shaft $h$, the several pulleys being operatively connected by belts $i^4$, $i^5$, and $i^6$, whereby the brush is driven from the main driving-shaft during the forward and backward movements of the carriage $d$. After the brush has been carried forward beneath the box and to a position beyond the end of the same the box is then slightly elevated to be above the path of the brush during its backward or return movement. When the brush has returned to its starting position, it is rendered temporarily stationary prior to its next forward movement by reason of the segmental gear $g^2$ moving from engagement with the gear $f^3$ in order to allow the box to be partially turned to present another side in a line parallel with the path of the brush. Such raising and turning of the box may be secured by any suitable means, the means as herein shown being as follows: The said vertically-movable plate $b$, by which the box-holder is carried, as hereinbefore described, is provided with an antifriction-roll $b^6$ at its lower end, which rests upon a cam $j$, as more clearly shown in Figs. 1 and 13. This cam is secured upon a shaft $j'$, which is operated from the rotating shaft $g$ by means of a segmental gear $j^2$ thereon meshing with a gear $j^3$ on the said shaft $j'$.

In the operation of the machine immediately after the brush has moved forward beneath the box, as described, the three-toothed portion of the gear $j^2$ meshes with the gear $j^3$ and causes a slight rotation of the shaft $j'$ with its cam $j$. This movement of the cam elevates the plate $b$ sufficiently to move the connected box-holder above the path of the brush during the return movement of the latter. After the cam $j$ has thus been operated to raise the box-holder it remains stationary to hold the latter in such position during the return movement thereunder of the brush, after which the second toothed portion of the gear $j^2$ by means of the continued rotation of the shaft $g$ engages with the gear $j^3$ and operates the latter to give the cam a one-half revolution from its original position, so as to support the succeeding side of the box, which latter has been given a quarter-turn during such movement of the cam in the same predetermined plane parallel with the path of the brush.

It will be understood that the brush operating in a certain horizontal path it is necessary that the several successive sides of the box should always be presented in the same plane relative to the said path of the brush. This is provided for in the case of an oblong or other similar irregular-shaped box by means of the cam and other coacting parts referred to—that is, as shown in the drawings, the cam is adapted to support the box with its long side in a certain plane, as shown in Fig. 1, and then at the proper predetermined time be given a partial or one-half revolution to raise the plate $b$ and support the box with its end in the same plane as the preceding side. In this manner it will be understood that the several successive sides of the box may each be presented to the brush in the same plane. In order to provide for boxes of different dimensions, I have supported the cam $j$ in a transversely-adjustable position upon the shaft $j'$, whereby its opposite plate-supporting surfaces may be adjusted relative to the axis of the shaft—i. e., the cam be secured with its said opposite surfaces an equal distance from the axis of the shaft for square boxes and with one side nearer to and the opposite side farther from said axis for boxes of different lengths.

To provide for the adjustment of the cam, I have provided the latter with an elongated slot to receive the shaft, whereby it may be moved transversely relative to the latter, as shown in Fig. 17, and have secured it in adjusted position in connection with a fixed collar $j^5$ on the shaft by means of an adjusting-screw $j^6$ on the cam engaging with the said fixed collar $j^5$, as shown in Figs. 16, 17, and 18. Two pins or screws $j^7$ $j^7$ connect with the collar $j^5$ and extend through two elongated slots $j^8$ $j^8$ in the cam, so as to serve in holding the latter from turning relative to its said supporting-collar.

Simultaneously with the raising or lowering of the box-holder by the action of the cam $j$ after the brush has moved back from beneath the box, as described, the box is given a quarter-turn for the purpose of presenting the next side of the box to the action of the brush. Such turning of the box may be secured by any suitable means, the means as herein illustrated being as follows: The box-holder shaft $c$, which is journaled in the block $b^3$, is provided with a bevel-gear $k$ at its rear end, which meshes with a bevel-gear $k'$, located on a vertically-arranged shaft $k^2$. This shaft $k^2$, which is journaled in suitable bearings in the frame, is provided with a second bevel-gear $k^3$, adjacent to its lower end, which meshes with a gear $k^4$, located in the end of a horizontally-arranged shaft $k^5$, which latter is driven from the intermittently-rotating shaft $j'$ through the medium of gears $k^6$ and $k^7$, as more clearly shown in Fig. 3. To secure the proper timing in the relative movements of the parts—that is, to turn the box simultaneously as it is being raised or lowered to hold such newly-turned side in the same plane as the preceding side—the teeth in the segmental gear $k^7$ are so arranged as to mesh or engage with the gear $k^6$ and give the box a quarter-turn only during such time as the shaft $j'$ is being operated to continue or complete the half-revolution of the cam $j$, which takes place after the latter has received its preliminary movement for the purpose of elevating the box during the return movement of the brush.

To provide for the vertical movement of the box-holder shaft $c$ with the block $b^3$ in its connections with the lower shaft $k^5$, I have provided the vertical shaft $k^2$ with a longitudinal slot $k^8$ therein, through which a pin extends from the gear $k^3$, so as to allow the shaft to have a vertical movement independent of said gear, and have journaled the upper end of the shaft in a fixed arm $k^9$ of the block $b^3$, which arm engages with the lower edge of the hub of the gear $k'$ and supports the shaft in vertical position, with the said gear $k'$ in mesh with the gear $k$.

As a simple means for assisting in holding the box-holder stationary after it has received its quarter-turn and while the brush is applying the strip to its under side I have secured a disk $l$, having four notches $l'$ in its periphery, upon the shaft $c$ and have supported a spring-pressed pin $l^2$ in the block $b^3$, which is normally held with one end extending into one of the said notches $l'$ in the disk $l$, as clearly shown in Fig. 1. This pin $l^2$ is operated from the shaft $j'$ to withdraw from the notch in the disk $l$ at the time the box-holder is given its preliminary vertical movement preparatory to the return movement of the brush beneath the box. This operation is secured by mounting a vertically-arranged shaft $m$ in bracket-arms $m'$ $m'$ of the supporting-frame and providing the same with a rigidly-connected arm $m^2$ adjacent to its upper end, which extends in front of a projection $m^3$ on the pin $l^2$, (see Fig. 2,) and with a second arm $m^4$ adjacent to its lower end, which engages with a cam $m^5$ on the shaft $j'$, as more clearly shown in Figs. 2 and 3. The forward pressure of the spring-pressed pin against the engaging arm $m^2$ of the shaft $m$ holds the lower arm $m^4$ on the latter with a yielding pressure against the cam $m^5$. Thus when the shaft $j'$ receives its first partial revolution to give the box-holder its preliminary vertical movement, as described, the cam $m^5$ on said shaft is thereby operated to act upon the engaging arm $m^4$ of the shaft $m$ and operate the latter to cause its upper arm $m^2$ to move the pin $l^2$ out of the notch in the disk $l$, whereby the latter is free to be turned. After the box-holder has been operated to receive its quarter-turn the cam $m^5$ has also been turned to a position to permit the pin $l^2$ to be pressed forward into the next notch in the disk $l$, which has been brought opposite the same.

In some instances, as when setting or adjusting the machine, it may be desirable to turn the box-holder independent of its automatic operating mechanism. To allow for this, I provide the shaft $m$ with a second lower arm $m^6$, which is connected with the fixed arm $m^7$ of a treadle-shaft $m^8$ through the medium of a link $m^9$. The shaft $m^8$ is provided with a foot-lever or treadle $m^{10}$. This construction permits the operator to operate the locking-pin at will and independent of its said automatic operating mechanism.

The covering-strip to be applied upon the box, as before stated, is of greater width than the box, whereby it will loosely project at either side beyond the edges of the latter after being applied thereto by the action of the brush. According to my present invention these loose projecting sides of the strip are turned around the edges of the box and applied to the adjacent surfaces of the latter by automatically-operating means, the means as herein illustrated being as follows: The brush-carriage $d$, which consists of a substantially square open frame or casting, as clearly shown in Figs. 2 and 7, is provided with two rods $n$ $n$, carried thereby, which extend in a direction lengthwise of the machine, on each of which, at a point in the rear of the brush, is pivotally supported a series of strip engaging and applying devices, which consist in the present instance shown of elbow-levers, (represented at $o$ and $p$, respectively.) The vertical arms of these levers are preferably formed of spring-wire and are each provided with a roll adjacent to their end, which rolls are arranged at varying angles relative to each other and adapted during the forward movement of the carriage to successively engage with the loose projecting sides or edges of the covering-strip and properly bend and apply the same to the adjacent surfaces of the box, as shown in Fig. 6. The rolls $o'$ on the several levers $o$ are adapted to engage with that edge (denoted at 1 in Fig. 5) of the covering-strip which is to be applied to the bottom of the box, and therefore are arranged with the first roll, or the one nearest the box, extending in a substantially horizontal position, so as to readily pass beneath the projecting edge of the covering-strip, while the following rolls are arranged at a substantially uniform variation of angle between said first roll and the last one, which latter is arranged in a substantially vertical position, as shown. By this construction it will be understood that as the carriage $d$ is moved forward to cary the brush beneath the box and apply the covering-strip thereto the several rolls $o'$ will successively engage with the projecting edge of the strip and gradually bend the same around the corner of the box and against the bottom of the latter, the last one or two rolls operating to press the said edges closely against the box.

As a means to insure the edge of the covering-strip being held against the edges of the box and in position to receive the first of the rolls $o'$ thereunder, as shown in Fig. 5, I have supported a block $o^2$ on the carriage immediately in front of the said rolls, the forward and inner sides of which are tapered backward and outwardly, respectively, so as to raise and hold the edge of the strip in position to insure the roll passing thereunder. At a point forward of this said block $o^2$ I have also provided the carriage with an arm $q$, having a roll $q'$, supported thereby in a position to engage with the projecting edge 2 of the covering-strip on the vertical side of the box and at the lower corner thereof and press the same against the bottom of the box, as shown in Fig. 5. This operation, preceding the application of the loose edge of the strip against the box by the rolls $o'$, insures the proper folding of the strip where it overlaps at the corners on the under side of the box.

The lower or horizontal arms of the lever $o$ are each provided with an antifriction-roller $o^3$ adjacent to their end, which rest during the forward movement of the carriage and until the levers are brought to a position opposite the box upon a cam or bed plate $r$. This plate serves to hold the levers in a position so that the rolls $o'$ may readily pass the forward corner of the box, and as the levers are carried past said corner the rollers on their lower arms move off the end of the plate, and so allow the rolls on their upper arms to be thrown, under the action of springs $o^4$, forward into engagement with the loose edge of the covering-strip, and so apply the same to the box with a yielding pressure. It will be obvious, however, that the lever-arms which carry the rolls $o'$ might be stationary upon the carriage and perform their function of bending and applying the loose edge of the strip upon the box.

The springs $o^4$, which throw the lever forward after passing beyond the plate $r$, are connected at one end with the levers at $o^5$ and at their opposite end connect with a fixed rod $o^6$, which is supported upon the carriage. Any undue forward movement of the levers under the action of said springs after passing from the plate $r$ is limited by a stop-bar $o^7$, against which a shoulder $o^8$ on the levers strikes.

The rolls $p'$ on the second or opposite series of levers $p$ are adapted to engage with that edge of the covering-strip at the top or open side of the box and turn the same into and against the inner wall of the latter. To accomplish this, the several rolls are supported at varying angles, so that when brought to a position past the vertical edge of the box and opposite the inside of the latter they will successively engage with the loose edge of the covering-strip and turn the same into and against the inner wall of the box, it being understood that the rollers $p^2$ on the levers resting upon the plate $r$ serve to hold the rolls $p'$ in a position to permit them to pass the corner of the box, and as said rollers $p^2$ move off the end of the plate thereby allow the levers to be rocked under the action of the springs $p^3$ to move the pressing-rolls $p'$ forward into engagement with the edge of the covering-strip. The last two or three of the rolls $p'$ bear upon the inner wall of the box with more or less pressure in pressing the turned-in edge of the covering-strip thereto, and as a support to the wall of the box under such pressure I have supported two rolls $n^2 n^2$ upon a plate $n^3$ immediately beneath the said upper pressing-rolls, which are carried beneath the under side of the box as a support to the latter under the pressure of the said upper rolls $p'$, as clearly shown in Fig. 6. The first of the series of levers $p$ is formed so that the end $p^6$ of its upper arm will be moved forward against the inner wall of the box after its lower arm has been moved from engagement with the plate $r$ and hold such side of the box from upward movement and in proper position relative to the following rolls $p'$, whereby the latter may properly perform their function of turning the loose edge of the strip around the edge of the box. A device performing such function of holding the edge of the box in a straight line in advance of the rolls $p'$ is desirable, for the reason that when the covering-strip is applied to the outer surface of the side of the box the glue or paste on the covering-strip dampens such side, and therefore would cause the same, particularly if formed of thin board, to bend or curl up at its outer or open edge if some provision, such as above described, was not made to prevent the same.

In order to provide for boxes of different widths, the rod $n$, on which the levers $p$ are pivotally supported, is connected with the plate $n^3$, which is laterally adjustable in the frame $d$ on two cross-rods $n^4 n^4$. This construction permits the levers $p$ being adjusted relative to the levers $o$ according to the depth of the box to be covered. The block $p^4$, having its forward and inner sides tapered backward and outwardly, respectively, for coöperating with the opposite block $o^2$ in raising and supporting the covering-strip and the rod $p^5$ for the support of the upper end of the springs $p^3$ are also connected with the plate $n^3$, to be movable therewith.

As the rolls on the upper arms of the levers $o$ and $p$ successively reach a position at the opposite end of the box during the forward movement of the carriage, the rollers on the lower arm of the levers engage with the tapering end of a second cam-plate $r'$ and are moved upward upon the latter, and thereby throw the rolls $o'$ and $p'$ backward and out of engagement with the box, so as to permit them to pass the end of the latter and also the projecting edges of the covering-strip.

The cam-plates $r$ and $r'$ are each supported to slide in horizontally-arranged grooves $r^2 r^2$ in the supporting-frame $a$, as more clearly shown in Figs. 3 and 4. It will be understood that these plates must be located with their inner or adjacent ends in a certain definite position relative to the ends of the box in order to properly regulate the rocking movements of the elbow-levers $o$ and $p$ into and from engagement with the box, as described, and for this reason it is desirable that the plates should be automatically adjusted to conform to the difference in the length of the sides and ends of the box as they are successively presented to the brush and rolls and also to the different sizes of boxes. I secure such automatic adjustment in the present instance shown as follows: A double rack $r^3$ is connected with the vertically-movable plate $b$ and meshes with two oppositely-located segmental gears $r^4$ and $r^5$, which are journaled in fixed bracket-arms of the supporting-frame, as more clearly shown in Fig. 2. These gears $r^4$ and $r^5$ are each connected with the plates $r$ and $r'$, respectively, through the medium of two levers $r^6$ and $r^7$, which are pivotally supported upon fixed arms of the frame $a$, with their inner or adjacent ends having a slot-and-pin connection and with the outer end of the lever $r^6$ having a link connection with the lower end of the gears at $r^8$ and the outer end of the lever $r^9$ having a link connection with the center of the cam-plates at $r^9$, as shown. By this construction it will be understood that as the plate $b$ is either raised or lowered with the box-holder for the purpose of supporting either the end or side of the box in the path of the brush, as before described, the connected rack $r^3$ will also be moved therewith to operate the engaging gears, and thereby move the connected plates $r$ and $r'$ either toward or away from each other, according to the length of the box side to be presented for the application of the covering-strip. For instance, after the long side of the box has had the strip applied thereto, as shown in Fig. 1, the plate $b$ is then raised a certain distance to support the end of the box when turned in the same plane as that in which the preceding long side of the box was supported, and such raising of the plate $b$ causes cam-plates $r$ and $r'$ to be moved toward each other a sufficient distance so that their adjacent ends will coincide with the ends of that side of the box just presented. At the next turn of the box when the block $b^3$ is lowered the said cam-plates will then be moved apart, &c. In setting these plates $r$ and $r'$ for a certain size of box the box is first placed on the box-holder, which is properly adjusted to receive the same, and the rack $r^3$, which has a sliding dovetailed connection with the plate $b$, as shown, is then moved either up or down on the latter to bring the connected plates in their proper position relative to the ends of the box, after which it is secured in fixed adjusted position on the plate by means of a set-screw $r^{10}$.

When the covering-strip is being applied to the box and before it is caused to adhere to each side thereof by the brush, its edges have a tendency to sag and curl by reason of the strip being dampened by the adhesive material thereon, and in order to prevent such undue sagging, whereby the brush may spread the strip smoothly upon the box, I have supported two blocks $x$ and $x'$ upon the carriage $d$, to be carried thereby, the upper surfaces of which are tapered, as shown, so as to move beneath the edges of the strip and support the same to insure its being properly presented to the brush. One of the blocks, $x$, is supported upon the forward cross-rod $n^4$ and the other, $x'$, upon the plate $n^3$, to be laterally adjustable therewith.

After the covering-strip has been located on the several sides of the box and its loose edges turned and applied to the latter, as before described, the turned-in edges of the strip at the four inside corners of the box require a further pressing in order to cause them to closely fit into the box-corners and give the box that finished appearance which is desirable, it being understood that the rolls $p'$ when operating on the inside edge of the box do not closely conform to the corners of the latter. Such further pressing and fitting of the edges of the strip in the corners of the box may be done by hand, if desired; but it is preferable that the same should be done on the machine, and to accomplish this I have supported a rod $v$ in the hollow box-holder shaft $c$, with its front end projecting forward through the latter and having a cross-rod $v'$ attached thereto. The opposite ends of this cross-rod connect with two bars $v^2 v^2$ by extending through central openings therein, which bars connect at their ends with four sliding blocks $v^3$, which are supported on the arms $c^5$ of the box-holder, as clearly shown in Figs. 3, 9, 10, and 11. By this construction it will be understood that the rod $v$ may be pushed forward in the shaft $c$ and move the connected blocks $v^3$ longitudinally on the arms $c^5$ and into the corners of the box, so as to closely press the turned-in edges of the strip against the same. The forward corners $v^4$ of the blocks $v^3$ are slightly tapered, as shown, so as to permit their ready entrance into the box and also allow them to engage with the edges of the strip without tearing the same. The entrance of the blocks $v^3$ into the box is further permitted by means of the blocks $v^5$ on the ends of the arms $c^5$, which engage with the box to support the same, with a space between its inner wall and the said arms. The bars $v^2 v^2$ connect with the blocks $v^3$ by extending loosely through openings therein, and such connection, together with the loose sliding connection between the said bars and the cross-rod $v'$, permits the varied adjustments of the box-holder arms $c^5$, as hereinbefore described, without interfering therewith. The rod $v$ may be operated to move the blocks $v^3$ by hand or any other suitable means, the same as herein shown being adapted to be operated by a foot-treadle $w$ through the medium of connecting means, which latter, as herein shown, consists of a vertically-arranged shaft $w'$, which is supported in bracket-arms $w^2 w^2$ of the supporting-frame and provided with a fixed parallel arm $w^3$ adjacent to its upper end, which extends between two fixed disks $w^4 w^4$ on the rod $v$, and with a second fixed arm $w^5$ adjacent to its lower end, which is connected with the fixed arm $w^6$ of the treadle-shaft $w^7$ through the medium of a link $w^8$. By pressing down upon the treadle $w$ it gives the connected shaft $w'$ a partial rotation, and thereby moves the end of its upper arm $w^3$ in a direction to throw the rod $v$, with the connected blocks $v^3$, forward. Upon removing the pressure from the said treadle a connected spring $w^9$ elevates the same, and thereby operates the several parts to withdraw the blocks from their position within the box.

During the operation of the machine and after the covering-strip has been partially applied to the box the said strip is adapted to be cut at a desired point to give the proper length of strip for covering the box. Such severing of the strip may be secured by any suitable means, the means as herein shown consisting of a cutter device $s$, which comprises a stationary blade $s'$ and a pivoted blade $s^2$, both of said blades being carried by a bracket-arm $s^3$, which is supported to slide on one of the rods which carry the strip-guiding arms $e^4$. The pivoted blade $s^2$ is connected at its rear end with a link $s^4$, which has a horizontal sliding connection at its lower end with a shaft $s^5$, which latter is loosely supported in two slotted swinging arms $s^6$ $s^6$, attached to the supporting-frame. A vertically-disposed rod $s^7$ is connected at its upper end with the said cross-shaft $s^5$ and is provided with a pin or projection $s^8$ in one side thereof, which is yieldingly held in engagement with an operating cam-disk $t'$ on a shaft $t$ by means of a coiled spring $s^9$, which bears at one end against a collar $s^{10}$ on said shaft and at its opposite end against a fixed arm $s^{11}$ of the supporting-frame. The said shaft $t$, which carries the cam $t'$, is driven from the shaft $g$ through the medium of gears $t^2$ and $t^3$, as more clearly shown in Fig. 15, and is so timed that the projection $t^4$ of the cam $t'$ is caused to engage with the pin $s^8$ on the rod $s^7$, so as to raise the latter and operate the cutter once during every complete revolution of the box-holder. The rod $s^7$ is connected at its lower end with a foot-lever $s^{12}$, whereby it may be raised to operate the cutter independent of its automatic operating mechanism. In order to adjust the cutter for severing the strip in different lengths according to the size of the box to be covered, the bracket-arm $s^3$, which supports the cutter, is shifted longitudinally upon its supporting-rod, and the lower end of the connecting-links $s^4$ is also correspondingly shifted on the shaft $s^5$. Such construction permits the cutter to be readily adjusted without interfering with the rod $s^7$ and its connecting operating parts.

The clutch mechanism for automatically stopping the machine after the box has been covered consists of an ordinary crab-clutch $u$, supported on the driving-shaft of the machine and having connection with a pivoted elbow-lever $u'$, by means of which the operator may move the clutch into position to render the machine operative, and also having connection with a second elbow-lever $u^2$, which latter is pivotally supported on the frame at $u^3$, with the end of its lower arm connected with a vertically-arranged rod $u^4$, which is provided with a pin $u^5$ on one side thereof for engagement with a cam $u^6$ on the shaft $t$. A coiled spring $u^7$ on the rod $u^4$ bears at one end against a fixed arm $u^8$ of the supporting-frame and at its opposite end bears against a collar on the said rod to yieldingly hold the pin $u^5$ on the latter in engagement with the periphery of the cam. The pin $u^5$ or a roller thereon riding on the periphery of said cam allows the clutch to remain in its operative position; but when the notch $u^9$ in the cam, as shown clearly in Fig. 16, reaches a position opposite the said pin the latter is forced therein by the action of the spring, and thereby causes the elbow-lever $u^2$ to rock and move the clutch from engagement with its connecting part, and so stop the machine.

Having thus set forth a practical embodiment of my invention, I do not wish to be understood as confining myself to the particular construction and arrangement of the parts as illustrated and described, as the same may be very materially modified without departing from the spirit of my invention, for

What I claim is—

1. In a box-covering machine, the combination, with a box-holder, of a reciprocating carriage operating in a path parallel with one side of a box and having means carried thereby for engaging with and applying a covering-strip to a box on said holder, and means for operating the carriage.

2. In a box-covering machine, the combination, with a box-holder, of a reciprocating carriage operating in a path parallel with one side of a box and having a brush supported thereby for applying a covering-strip to the box, means for operating said carriage, and means for communicating a rotary movement to the brush.

3. In a box-covering machine, the combination, with a box-holder, of means reciprocating in a given path for engaging with a covering-strip and applying the same to a box, and means for engaging with the covering-strip in advance of said applying means and supporting its edges, for the purpose set forth.

4. In a box-covering machine, the combination, with a box-holder, of a reciprocating carriage provided with a brush or device supported thereby for applying a covering-strip to a box, and having means supported in advance of said brush for engaging with the strip to support its edges, and means for operating said carriage.

5. In a box-covering machine, the combination, with a box-holder, of means reciprocating in a given path for engaging with a covering-strip and applying the same to a box, and devices for engaging with the covering-strip in advance of said applying means and supporting its edges, one of said devices being laterally adjustable relative to the other.

6. In a box-covering machine, the combination, with a box-holder, of means reciprocating in a given path for engaging with the projecting edge of a covering-strip and acting upon the same in a longitudinal direction to bend and press the same against the bottom or adjacent side of a box carried by said holder.

7. In a box-covering machine, the combination, with an intermittently-rotating box-holder, of means for applying a covering-strip to the outer wall of a box, and means operating in a fixed path parallel with one side of a supported box for engaging with the loose edge of the covering-strip and bending and pressing the same against the inner wall of the box.

8. In a box-covering machine, the combination, with an intermittently-rotating box-holder, of a reciprocating carriage operating in a path parallel with one side of a supported box, provided with a series of arms arranged at varying angles relative to each other for successively engaging with the projecting edge of a covering-strip and operating to gradually bend and press the same against the bottom or adjacent side of the box.

9. In a box-covering machine, the combination with an intermittently-rotating box-holder, of a reciprocating carriage operating in a path parallel with one side of a supported box, provided with a series of spring-arms arranged at varying angles relative to each other for successively engaging with the projecting edge of a covering-strip and operating to gradually bend and press the same against the bottom or adjacent side of the box.

10. In a box-covering machine, the combination, with an intermittently-rotating box-holder, of a reciprocating carriage, operating in a path parallel with one side of a supported box, and provided with means carried thereby for engaging with the projecting edge of a covering-strip and acting upon the same to bend and press it against the bottom or adjacent side of the box.

11. In a box-covering machine, the combination, with an intermittently-rotating box-holder, of a reciprocating carriage operating in a path parallel with one side of a supported box, provided with means for engaging with the projecting edge of a covering-strip to bend and press the same against the bottom or adjacent side of the box, and with means in advance of said strip bending and pressing means for engaging with and supporting the projecting edge of the strip.

12. In a box-covering machine, the combination, with a box-holder, of a reciprocating carriage operating in a path parallel with one side of a box, a series of levers supported by said carriage, means for operating said levers to move the same into engagement with the covering-strip when opposite the box, and away from engagement therewith when in a position at the end of the box.

13. In a box-covering machine, the combination, with a box-holder, of a movable carriage, a lever supported by said carriage, and means operating said lever to move the same forward into engagement with the covering-strip when opposite the box, and backward from engagement therewith when in a position at the end of the box.

14. In a box-covering machine, the combination, with a box-holder, of a movable carriage, a strip-engaging device supported upon said carriage, and means for automatically moving said device forward into engagement with the covering-strip when opposite the box, and backward from engagement therewith when in a position at the end of the box, such automatic movement of the strip-engaging device being substantially at right angles to the movement of its carriage.

15. In a box-covering machine, the combination, with a box-holder, of a movable carriage operating in a path parallel with the edge of a supported box, a device carried by such carriage for engaging with a covering-strip upon the box, and means acting upon said device during the movement of the carriage to successively hold the same back from the edge of the box to permit it to pass one end of the latter, then enter it into the box to act upon the covering-strip, and then withdraw the same from within the box prior to reaching the opposite end of the latter, for the purpose set forth.

16. In a box-covering machine, the combination, with a box-holder, of a movable carriage operating in a path parallel with the edge of a box on said holder and provided with a roller thereon for passing beneath the box and supporting the same, and a device supported upon said carriage for engaging with a covering-strip and pressing the same upon the box.

17. In a box-covering machine, the combination, with a box-holder, of a movable carriage operating in a path parallel with the side of a box on said holder, a lever pivotally supported by said carriage to be moved therewith, and cam-plates located at opposite ends of the box to engage with said lever and control its movement in a direction toward and away from the box for the purpose set forth.

18. In a box-covering machine, the combination, with a box-holder, of a movable carriage operating in a path adjacent to one side of a box in said holder, a lever pivotally supported by said carriage to be movable therewith, and adjustable cam-plates located at opposite ends of the box to engage with said lever and control its movement in a direction toward and away from the box for the purpose set forth.

19. In a box-covering machine, a box-holder, a reciprocating carriage having means for applying a covering-strip to a box on said holder, means for operating said holder to successively present the several sides of a box thereon in the path of said strip-applying means, and means for automatically adjusting the position of the box-holder according to the form of the supported box whereby the several sides of the latter will be presented to the strip-applying means in the same plane.

20. In a box-covering machine, a box-holder, means for giving said holder a partial revolution at certain predetermined times and adjusting the vertical position of the same whereby the several sides of a box on said holder will be successively presented in the same predetermined plane, and means for applying a covering-strip upon the box on said holder.

21. In a box-covering machine, a box-holder, means for operating said holder to simultaneously give the same a partial turn and adjust its vertical position whereby the several sides of a box on said holder will be successively presented in the same plane, and means for applying a covering-strip upon the box on said holder.

22. In a box-covering machine, a box-holder, means for giving said holder a partial turn at certain predetermined times, means, embodying a cam, for automatically adjusting the vertical position of said holder whereby the several sides of a box thereon will be presented in the same predetermined plane, and means for applying a covering-strip upon the box on said holder.

23. In a box-covering machine, a box-holder, a shaft carrying said holder, a vertically-adjustable block in which said shaft is journaled and carried, means for operating said shaft to give the holder a partial turn at certain predetermined times, means for automatically moving said block to regulate the position of the holder, and means for applying a covering-strip upon the box in said holder.

24. In a box-covering machine, a box-holder, means for giving said holder a partial revolution at certain predetermined times and adjusting the vertical position of the same whereby the several sides of a box on said holder will be successively presented in the same predetermined plane, and means for automatically locking said holder in certain predetermined positions.

25. In a box-covering machine, a box-holder, means for revolving said holder, means for automatically locking said holder in certain predetermined positions, and means for automatically releasing said holder at certain predetermined times.

26. In a box-covering machine, a box-holder, a shaft carrying said holder and having a notched disk thereon, a spring-pressed pin normally engaging said disk to enter the notches therein and hold the box-holder from rotary movement, and means for automatically withdrawing said pin from engagement with the notched disk.

27. In a box-covering machine, a box-holder, a reciprocating carriage having means for applying a covering-strip to a box on said holder, a device carried by said carriage for acting upon the edge of said covering-strip, adjustable cam-plates located at opposite ends of the box for engaging with said device and controlling its movement in lateral direction toward and away from the box, and means for adjusting the box-holder and the said cam-plates relative to each other whereby the position of the cam-plates will correspond to the length of the box side presented for the application of the covering-strip.

28. In a box-covering machine, a box-holder, a reciprocating carriage having means for applying a covering-strip to a box on said holder, a device carried by said carriage for acting upon the edge of said covering-strip, adjustable cam-plates for engaging with said device to control its movement in a direction toward and away from the box, means for turning said box-holder at certain predetermined times to present its several sides to the strip-applying means, means for automatically adjusting the position of the box-holder whereby the several sides of an oblong or other irregular-shaped box may be presented in a certain predetermined plane, and means automatically adjusting the position of said cam plates according to the length of the box side presented for the application of the covering-strip.

29. In a box-covering machine, a box-holder, a movable carriage having means for applying a covering-strip to a box on said holder, a device carried by said carriage for acting upon the edge of said covering-strip, adjustable cam-plates for engaging with said device to control its movement in a direction toward and away from the box, means for turning said box-holder at certain predetermined times to present its several sides to the strip-applying means, means for adjusting the position of the box-holder whereby the several sides of an oblong or other irregular-shaped box may be presented in a certain predetermined plane, and means operatively connecting said cam-plates with the box-holder whereby their position will be regulated by the movement of the latter.

30. In a box-covering machine, a box-holder, a movable carriage having means for applying a covering-strip to a box on said holder, a device carried by said carriage for acting upon the edge of said covering-strip, an adjustable cam or cam-plate for engaging with said device to control its movement in a lateral direction toward and away from the box, means for turning said box-holder whereby the several sides of an oblong or other irregular-shaped box may be presented in a certain predetermined plane, and means operatively connecting said cam-plate with the box-holder whereby its position will be regulated by the movement of the latter.

31. In a box-covering machine, a box-holder, means for engaging with the loose edge of a covering-strip to bend and press the same against the inner wall of a box, and means for entering the box and pressing the edge of the covering-strip against the inner corner of the same.

32. In a box-covering machine, a box-holder, means for applying a covering-strip to the outer wall of a box, means moving in a direction substantially parallel with the box and engaging with the loose edge of the covering-strip to bend and press the same against the inner wall of the box, and means having a movement to and from a position within the latter for pressing the edge of the covering-strip against the inner corner of the same.

33. In a box-covering machine, a box-holder, means for applying a covering-strip to the outer wall of the box, means engaging with the loose edge of the covering-strip and bending and pressing the same against the inner wall of the box, and a block supported to be movable to and from a position within the box, having a portion of its surface conforming to the inner corner of the latter for pressing the edge of the covering-strip therein.

34. In a box-covering machine, a box-holder, consisting of a suitable head having box-supporting arms, means for applying a covering-strip to the outer wall of the box, means engaging with the loose edge of the covering-strip and bending and pressing the same against the inner wall of the box, blocks supported to slide upon said arms of the box-holder, and means connecting said blocks whereby the same may be moved to and from a position within the box to press the edge of the covering-strip against the corner of the same.

35. In a box-covering machine, a box-holder, a reciprocating carriage having means for applying a covering-strip to the outer wall of a box, and means automatically moving the said box-holder from its normal position during the return movement of the carriage, and returning the same to its proper position preparatory to the forward movement of the carriage.

36. In a box-covering machine, a box-holder, a vertically-adjustable block carrying said holder, a reciprocating carriage having means for applying a covering-strip to a box on said holder, and a rotating cam engaging said adjustable block and operating the same to raise the box-holder from its normal position relative to the path of the carriage during the return movement of the latter.

37. A box-holder consisting of a cross-head, two plates supported to slide on said head, blocks having box-supporting arms, supported to slide on said plates in a direction at right angles to the movement of the latter on the cross-head, and means holding the parts in an adjusted position.

38. In a box-covering machine, the combination, with a box-holder, of means operating in a given path for engaging with a covering-strip and applying the same to a box on said holder, and means for rotating the box-holder with an intermittent movement to successively present the several sides of a supported box in the path of the strip-applying means and holding the same stationary while being acted upon by the latter, for the purpose set forth.

CHARLES B. BALDWIN.

Witnesses:
CHAS. F. DANE,
CLINTON W. SOVEREL.